United States Patent [19]
Paul et al.

[11] Patent Number: 5,231,247
[45] Date of Patent: Jul. 27, 1993

[54] COMPARTMENT MODULE AND DISTRIBUTION SYSTEM ASSEMBLED THEREWITH

[75] Inventors: Paulus Paul, Nijmegen; Ysbrand P. J. M. Ponsioen, Alphen A/D Rijn, both of Netherlands

[73] Assignee: Holec Systemen en Componenten B.V., Hengelo, Netherlands

[21] Appl. No.: 708,378

[22] Filed: May 31, 1991

[30] Foreign Application Priority Data

Jun. 1, 1990 [NL] Netherlands .................. 9001258

[51] Int. Cl.⁵ ............................................. H02B 1/46
[52] U.S. Cl. ............................. 174/50; 361/333; 361/429
[58] Field of Search ............... 174/50; 361/333, 396, 361/429; 200/307

[56] References Cited

FOREIGN PATENT DOCUMENTS

| | | | |
|---|---|---|---|
| 1106834 | 5/1961 | Fed. Rep. of Germany | 361/429 |
| 1910658 | 10/1969 | Fed. Rep. of Germany | 361/429 |
| 1314060 | 11/1962 | France | 174/50 |
| 50883 | 11/1966 | German Democratic Rep. | 174/50 |

Primary Examiner—Leo P. Picard
Assistant Examiner—David A. Tone
Attorney, Agent, or Firm—Watson, Cole, Grindle & Watson

[57] ABSTRACT

A compartment module for a metal-enclosed, modular medium-voltage distribution system has an essentially box-type construction and includes a first set of mutually opposite completely closed walls, a second set of mutually opposite walls having identical large openings bounded by a narrow flange, and a third set of mutually opposite walls having small openings bounded by a wide flange. When assembled, a number of the modules can be arranged to face one another with similar walls and the remaining openings closed off by a cover. The modules can be mechanically coupled to each other by bolt joints or clamp joints in order to obtain a mechanical and electromagnetic seal. A method of manufacturing a module from sheet metal, and a method of manufacturing a medium-voltage distribution system from standard modules includes using isolators and busbar systems.

8 Claims, 9 Drawing Sheets

COMPARTMENT MODULE AND DISTRIBUTION SYSTEM ASSEMBLED THEREWITH

The invention relates to a compartment module for a metal-enclosed, modular medium-voltage distribution system, which module is essentially of box-type construction.

A medium-voltage distribution system comprises a number of different components, such as power switches, separating-devices, earthing devices, cable terminations and busbar systems.

A high degree of reliability and safety is achieved if each component has its own closed metallic casing. In this case, reference is made to metal-clad within IEC 298 which has to comply with a large number of requirements, such as:

mechanical rigidity of the system for the attachment of the various components;

mechanical strength in the event of an unexpectedly occurring internal fault resulting in a substantial rise in pressure;

outward electromagnetic screening, that is to say the prevention of strong electromagnetic fields generated within the primary part of the system radiating outwards so that unacceptable faults occur in the operating electronics;

the ability to pass total or partial short-circuit currents through the metallic enclosure in the event of a fault to earth.

A correct choice of the design of said medium-voltage distribution system makes it possible to give the enclosure of each component a modular nature. A medium-voltage distribution installation can then be assembled from a limited number of said modules for each section. The modules should be linked together by means of a standard connecting technique which ensures a homogeneous current transfer to the enclosures, that is to say renders the installation electromagnetically impervious, while said connecting technique also ensures a good seal between the modules.

It is pointed out the EP-204,082 discloses a compartment module with which distribution systems can be assembled in various ways and can be altered again without the compartment module itself having to be substantially adapted. For this purpose, the module has an essentially rectangular shape and has openings on all six sides by means of which the components contained in said compartment can be connected electrically to the remainder of the distribution system. This known module is manufactured by casting.

The cost price of such a cast module is, however, considerably affected by the numbers which can be produced as a batch. Below a certain number, therefore, a cast module will not be attractive because of the relatively high cost price. The cost price will also be affected by the size of the module, and specifically in a manner such that a small module will work out more favourably in price than a large module. In addition, an alteration in the construction of the module is not readily possible and the stocking of such modules will require considerable storage space.

EP-30,489 discloses another possibility for manufacturing compartment modules. These known modules are constructed from separate steel sheets which are assembled together to form a whole with the aid of components placed inside the module. However, this requires a special assembly method.

Although a number of disadvantages of the cast modules mentioned above no longer occur in this case, many parts are needed to assemble such a module and this therefore requires a relatively large amount of assembly time. In addition, the special assembly method makes alteration and/or extension of an existing installation very difficult.

The invention now provides a compartment module in which the advantages of the known modules are exploited and combined as much as possible, while avoiding the disadvantages thereof.

The invention therefore provides a compartment module of the type mentioned in the introduction which is characterised by a first set of mutually oppositely situated, completely closed walls, a second set of mutually oppositely situated walls which has identical large openings bounded by a narrow flange, a third set of mutually oppositely situated walls which has small openings bounded by a wide flange, all these features being such that, when assembled, the modules can be arranged to face one another with similar walls and the remaining openings can be closed off by a cover.

By means of a plurality of such, preferably cubic, compartment modules according to the invention, medium-voltage distribution installations can be assembled in various ways and be readily altered and/or extended because one and the same module can always be assembled in several of three mutually perpendicular positions.

In the compartment module according to the invention, the narrow flange preferably comprises a strip, directly adjoining the large opening, of the wall concerned, which is twice bent over outwards at right angles to produce a U-shaped channel whose opening is directed outwards, which projects outside the plane of the module wall and which preferably extends over the entire length of each side wall. Furthermore, the wide flange in the case of the small opening consists of the wall concerned itself, the part directly adjoining the opening being provided over the entire circumference with a groove formed by the wall, the open side of which groove is arranged to face the outside of the module.

In order to increase the rigidity of the module further, corner pieces can be provided in each of the angular points of the opening in the walls having the narrow flanges and be securely assembled against the narrow flange rim.

The modules can furthermore be mechanically coupled to one another in a simple and known manner, for example by means of bolt joints or clamped joints. In addition, it is possible to obtain both a good mechanical and electromagnetic seal.

According to the invention, this is achieved, on the one hand, in that a supporting insulator which supports the components contained in the module and which is assembled between two modules adjoining each other by means of the narrow flanges contains a rim which can be clamped between the narrow flanges of the two modules situated next to each other, while the insulator rim is provide on both sides at the circumference with a raised rim facing said narrow flanges and has on either side, in the insulator surface which is in direct contact with the flanges, grooves in which sealing rubber can be provided, a U-shaped or C-shaped electrically conducting clamping strip which clamps round the two flanges and the insulator rim saturated in between providing for both the pressing of the narrow module flanges against the insulator rim and the electrical connection between the two modules.

With respect to the walls, to be linked to each other, of the modules in which the smaller opening is provided, a good seal is obtained, on the one hand, in that the grooves facing each other in the wide flanges of modules adjoining each other together form a space in which, for example, a sealing rubber can be provided which has a somewhat larger cross section than the cross section of said space, a U-shaped or C-shaped electrically conducting clamping strip which clamps round said two flanges providing both for the pressing of the module flanges against each other and the electrical connection between the two modules.

In order to be able to produce the modules according to the invention simply and efficiently and to be able to stock them, each module is manufactures from two wall parts which are completely identical to each other and which are then joined to each other to form a whole by a joining method, for example by riveting or welding or by a bolt joint.

A method according to the invention for manufacturing a compartment module comprising consecutively:

the punching or cutting of the blank of said two wall parts of the module from a metal sheet, it being possible for one of the wall parts to be extended in the longitudinal direction by means of a strip, the provision of the small opening having the wide flange in one of the two wall parts and of the openings, needed for mutual bending over the different module parts, between the wall parts, for example by punching, the provision of a groove in the flange around the small opening in the said wall part, for example by pressing in, the provision of the small flanges by bending over the long sides of the blank three times at right angles, the bending over of the two wall parts on each other at right angles, the bending over of the said strip at right angles, the joining of the two module halves to each other by means of the strip, for example by spot welding, the provision of the corner pieces.

Making use of two identical module halves, on the one hand, simplifies the production of the modules and, on the other hand, facilitates stocking them. In addition, it is easier to determine in this way how these modules can be manufactured with a minimum of sheet loss from the usual standard sheet dimensions of, for example 2500×1250 mm. The corner pieces required can easily be manufactured with the aid of the material which is left over from the openings.

The entire medium-voltage distribution installation can be assembled from a limited number of standard modules according to the invention for each section. A specific component is accommodated in each module. These components are not connected directly to the module but with the aid of the insulator clamped between two modules which, in addition to the dielectric function, therefore also has a supporting function. The switching components are located between the main busbar system running horizontally, for example situated in modules at the rear of the installation, and the section busbar system running vertically, for example situated in modules at the front of the installation (see, for example, Dutch Patent Application 8902799). This has the result that the insulators which act as carriers for the switching components are located between the modules which accommodate the two busbar systems mentioned earlier. The junction between the modules through which the main busbar system or the section busbar system, respectively, extends, is constructed without insulator. In this case, another method of attachment is used for the wider flanges, which method complies in other respects with the same boundary conditions as relate to mechanical strength and sealing. This method of attachment also makes use in this case of a U-shaped or C-shaped profile which is attached to the inside of the system around the flange rims provided in the modules.

The invention will now be explained in greater detail with reference to the drawings, which show a preferred embodiment of a module.

Figure 1:
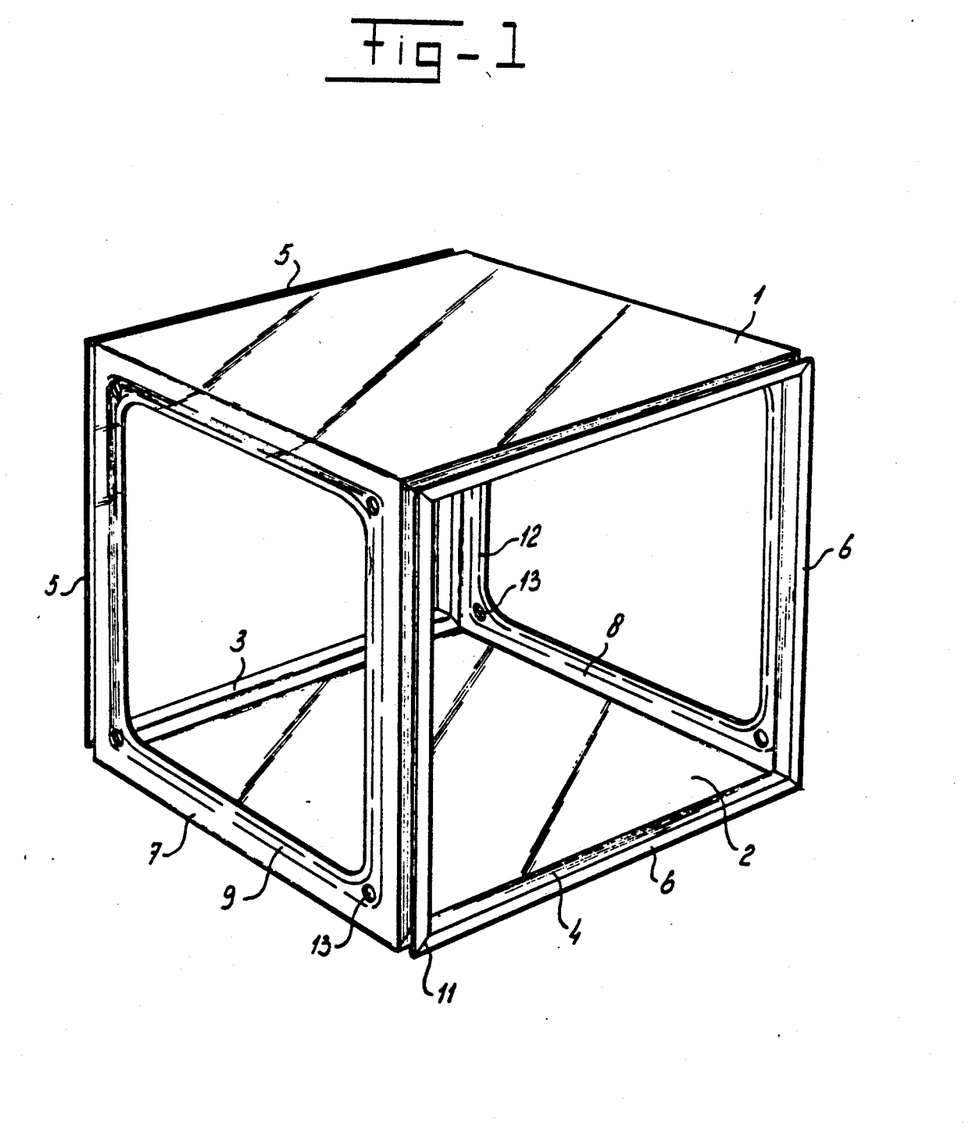
FIG. 1 shows in perspective a preferred embodiment of a compartment module according to the invention.

In the example, shown in FIG. 1, of a compartment module according to the invention, the latter has the shape of a cube and has two mutually oppositely situated, completely closed walls 1 and 2, two mutually oppositely situated walls 3 and 4 having identical large openings bounded by narrow flanges 5 and 6 and two mutually oppositely situated walls 7, 8 having smaller openings bounded by wider flanges 9, 10.

Figure 3:
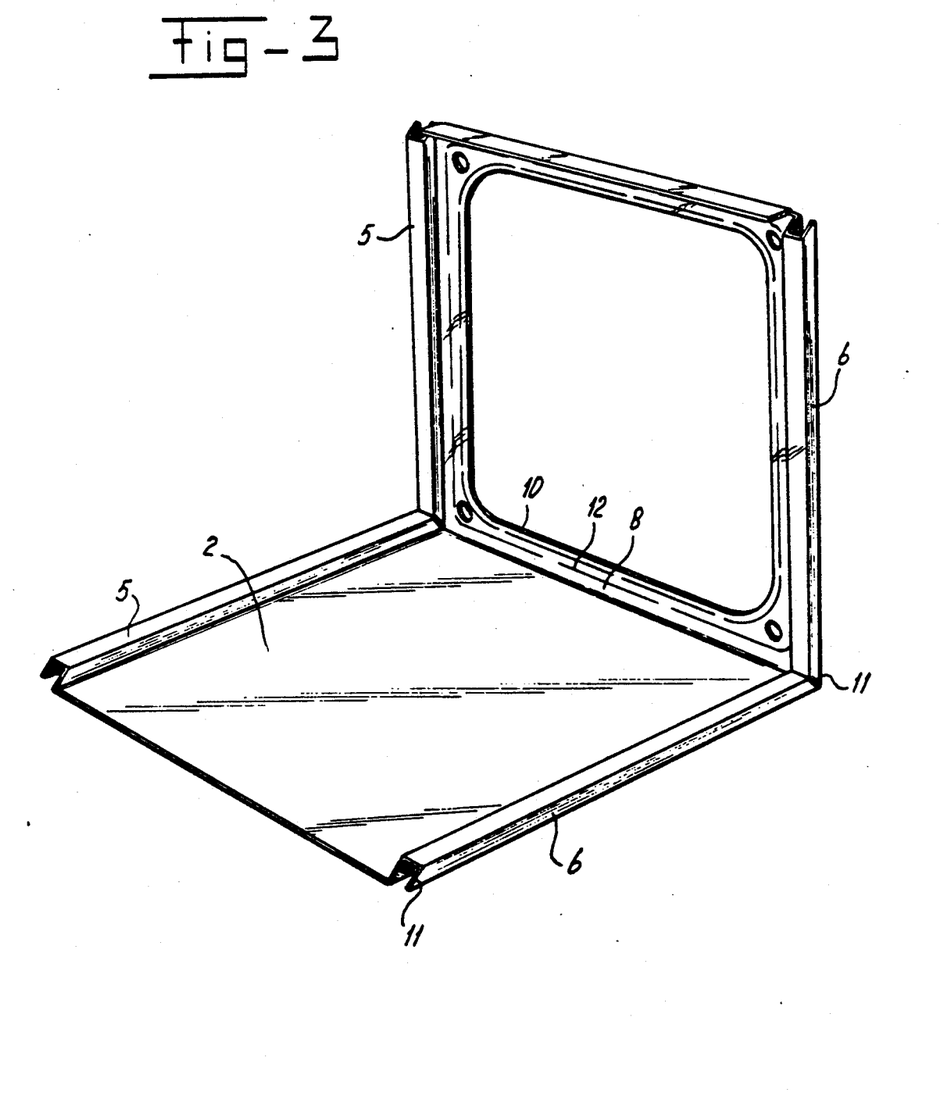
FIG. 3 shows in perspective a module half cut out of the plate according to FIG. 2 and then bent over, two of these halves being assembled to form a compartment module according to FIG. 1.

As is evident from FIG. 3, the narrow flanges 5 and 6 comprise a rim, bent over three times at right angles, of the metal sheet from which the compartment module has been manufactured. From FIG. 3 it is also evident that, in the extremities, that is to say in the corners of the side walls, said narrow flange 5, 6 forms, after being bent over three times at right angles, an angle of approximately 45° with the plane of the adjoining wall sheet, for example 2. As a result, the narrow flanges adjoin each other after the two wall parts have been bent over, as is shown at 11 and in FIGS. 1 and 3. Of course, other forms of joining the narrow flanges 5, 6 in the corners of the walls 3, 4 are also possible. Thus, two mutually oppositely situated narrow flanges 5, 6 may extend in both extremities, for example, completely up to the rim of the walls 3, 4 and form long flanges in doing so, while the two other narrow flanges 5, 6 of said walls 3, 4, which are perpendicular to the long flanges 5, 6, extend only up to the bend-over outside rim of the long flanges 5, 6.

FIGS. 1 and 3 furthermore show, by means of broken lines, grooves 12 which extend along the entire circumference of the wide flanges 9, 10. Said groove 12 is formed during punching and then forms a space whose open side with respect to the compartment module and the plane of the wall with the wide flange faces outwards to accommodate a sealing rubber or the like.

In the corner points of said wide flanges 9, 10, openings 13 are provided through which bolts can be inserted so that modules adjoining each other can be linked to each other.

Figure 2:
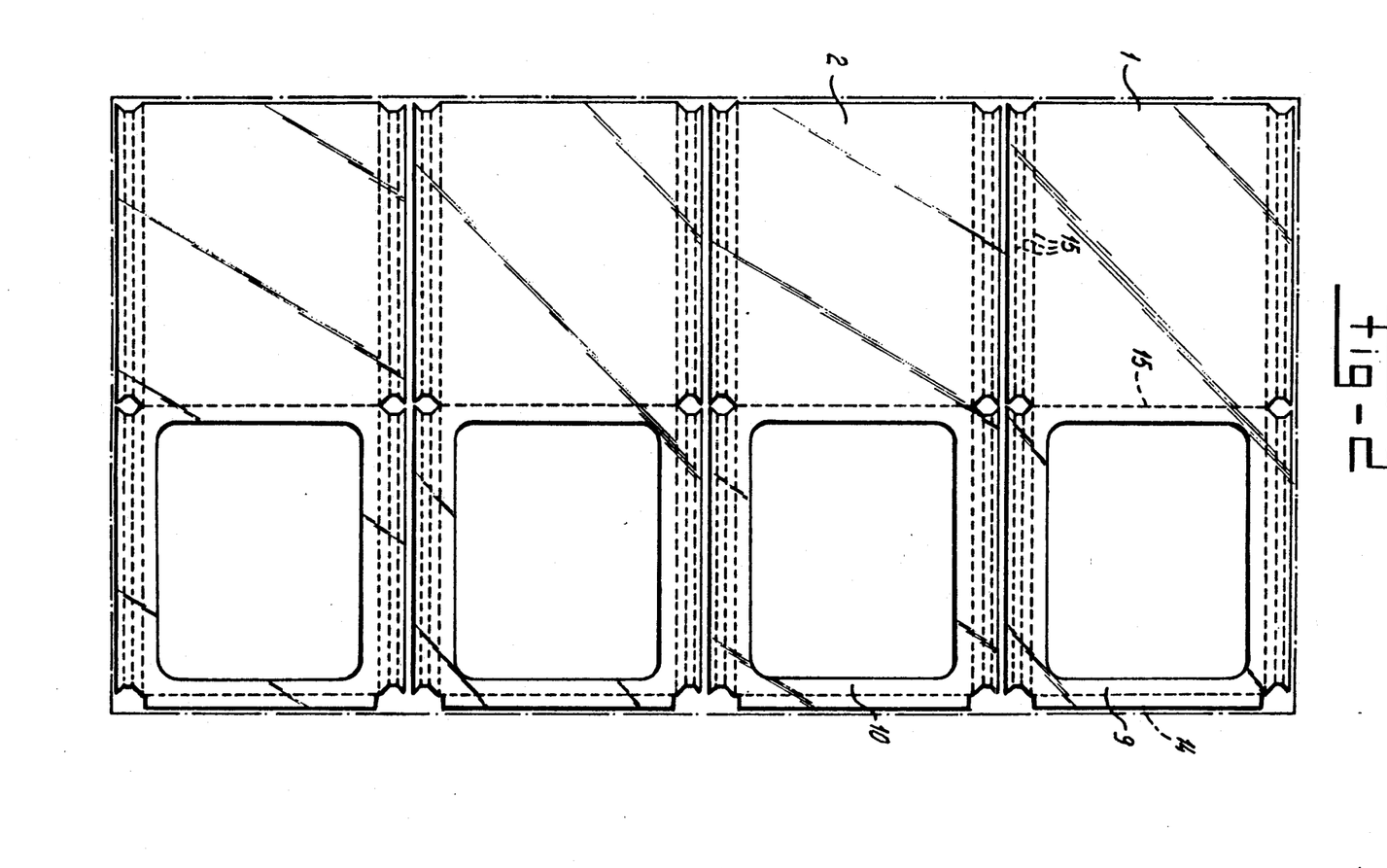
FIG. 2 shows a metal sheet containing a plurality of module halves which have been cut or punched out of it or have been obtained from it in another suitable way.

The module parts according to FIG. 3 can be cut out of a metal sheet 14, having the normal obtainable dimensions of 2500×1200×2 mm, as is shown in FIG. 2. From such a sheet 14, four compartment halves according to FIG. 3 can be punched. These four halves are shown separately in FIG. 2. On the left in FIG. 2, each module half has the said closed wall 1 or 2, respectively, and on the right it has the wall 7, 8 having the large flange 9 or 10, respectively, which bounds the smaller opening. The broken lines indicate the folding lines and the openings needed for bending over the parts.

In the method for manufacturing a module, each module half is cut out of the sheet 14 as is indicated by means of the solid lines. Then each sheet part is folded along the broken lines 15, which results in the module half which is shown in FIG. 2. Two of said cut and folded module halves are then attached to each other, and in particular, in a manner such that the closed walls 1 and 2, respectively, and the walls 7, 8 having the wide flanges 9 and 10 end up situated mutually opposite. The compartment halves can be attached to each other by welding or screwing. For this purpose, for example, each compartment half in FIG. 2 is preferably provided at the right-hand extremity having the wide flanges 9, 10 with an elongating strip, which is also bent over at a right angle and is then used to join this module half to the associated other module half, that is to say the rim of the closed wall. After these halves have been assembled, the module, in this example cubic, according to FIG. 1 is produced.

This has the mutually oppositely situated walls having the narrow flanges 5 and 6 which run around the openings 3 and 4 and which form a U-shaped channel. As stated, the extremities of said channels along a wall are precut in a manner such that after bending over three times at right angles, a cut is obtained which is at an angle of 45° to the plane of the adjoining wall. As a result, the U-shaped channels adjoin each other in the angular points of the compartment module. At this position, the inclined flange rims which adjoin each other can be welded to each other to produce a gastight module in this case as well. If joins at an angle of 45° are not used, but, for example, the joins mentioned above having long and short narrow flanges are used, the extremities of the short flanges can be welded to the bent-over outside rim of the long flanges.

From FIG. 1 it is evident that the module has a mirror symmetry with respect to the three main planes through its centre of gravity. As a result, the versatile application possibility is obtained.

Figure 4:
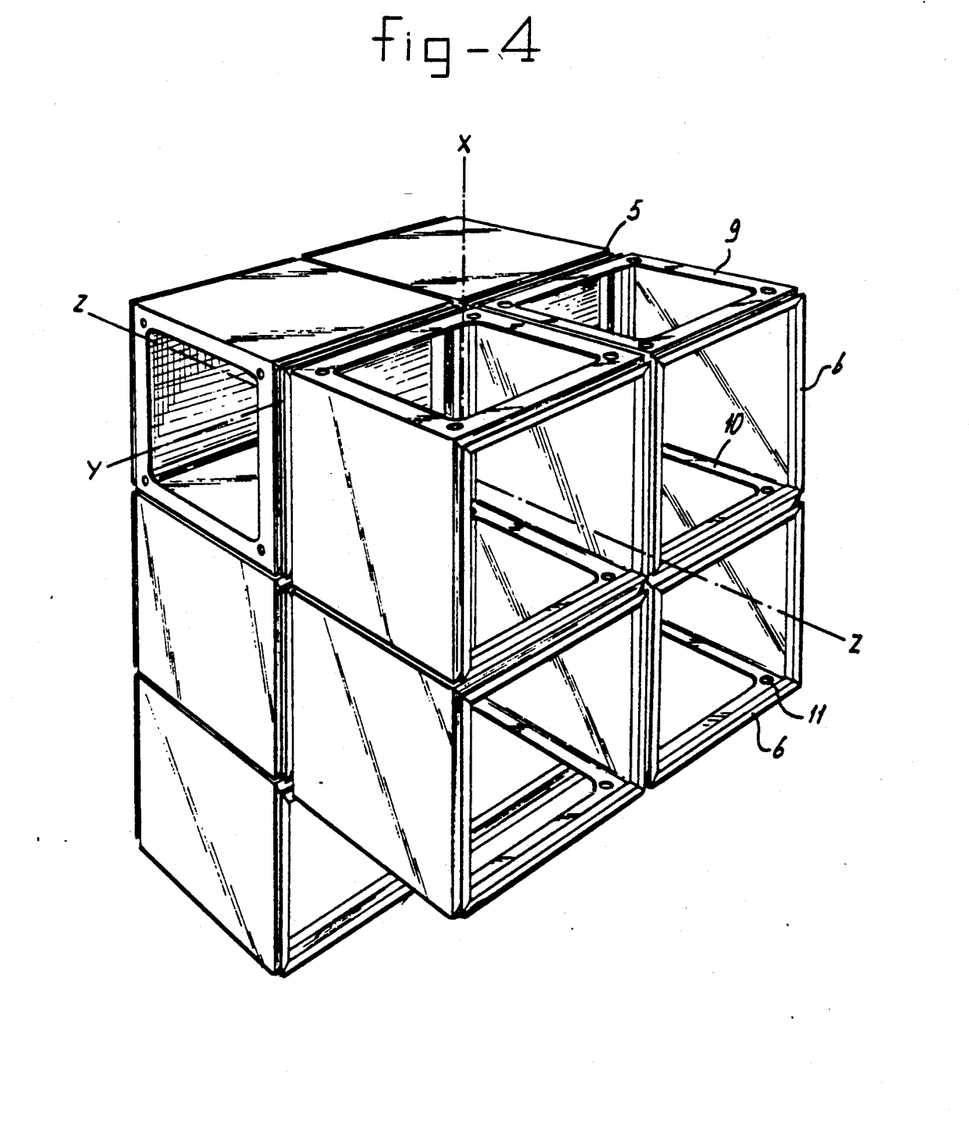
FIG. 4 shows in perspective a plurality of compartment modules according to the invention which are assembled next to and on top of one another in order to accommodate a medium-voltage distribution system.

FIG. 4 shows a plurality of modules according to FIG. 1 which are attached to one another and stacked on one another in a manner such that an electrical medium-voltage distribution system can be accommodated therein.

Located at the front in FIG. 4 are four compartment modules which are arranged next to one another and stacked on top of one another in a manner such that the walls having the small openings 7, 8 having the wide flanges 9 and 10, respectively, of modules placed on top of one another adjoin one another and thus form two parallel vertical passages. Through said two vertical passages situated next to each other, the main busbar system, which is also vertical, may extend. For more details see FIG. 9, in which a medium-voltage distribution system is shown according to Dutch Patent Application 890279 published Jun. 1, 1991, which can be assembled with the aid of the compartment modules according to the present invention.

Of the modules shown at the rear in FIG. 4, the two uppermost are rotated through a quarter turn with respect to the modules at the front. As a result, these two modules together form a horizontal passage through which, in the present case, a second, horizontal busbar system can extend, also shown in FIG. 9. The other modules situated at the rear in FIG. 4 can, of course, also be placed in such a manner that their small openings adjoin one another, as a result of which a plurality of parallel horizontal busbar systems can be provided.

The modules at the front and the adjacently situated modules at the rear may furthermore be arranged in a manner such that their large openings 3, 4 having the small flanges 5, 6 are situated in line with each other so that said modules therefore adjoin each other by means of their narrow flanges 5, 6.

Figure 5:
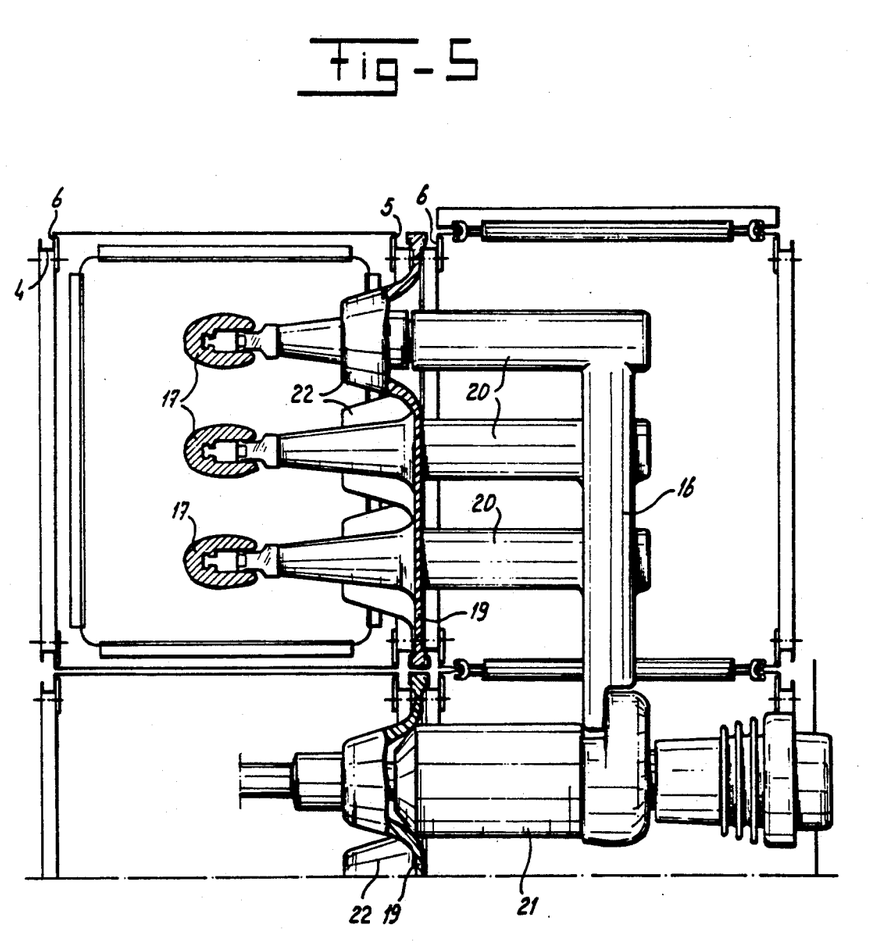
FIG. 5 shows a cross section through a few assembled modules with a part of the medium-voltage distribution system accommodated in said modules.
Figure 9:
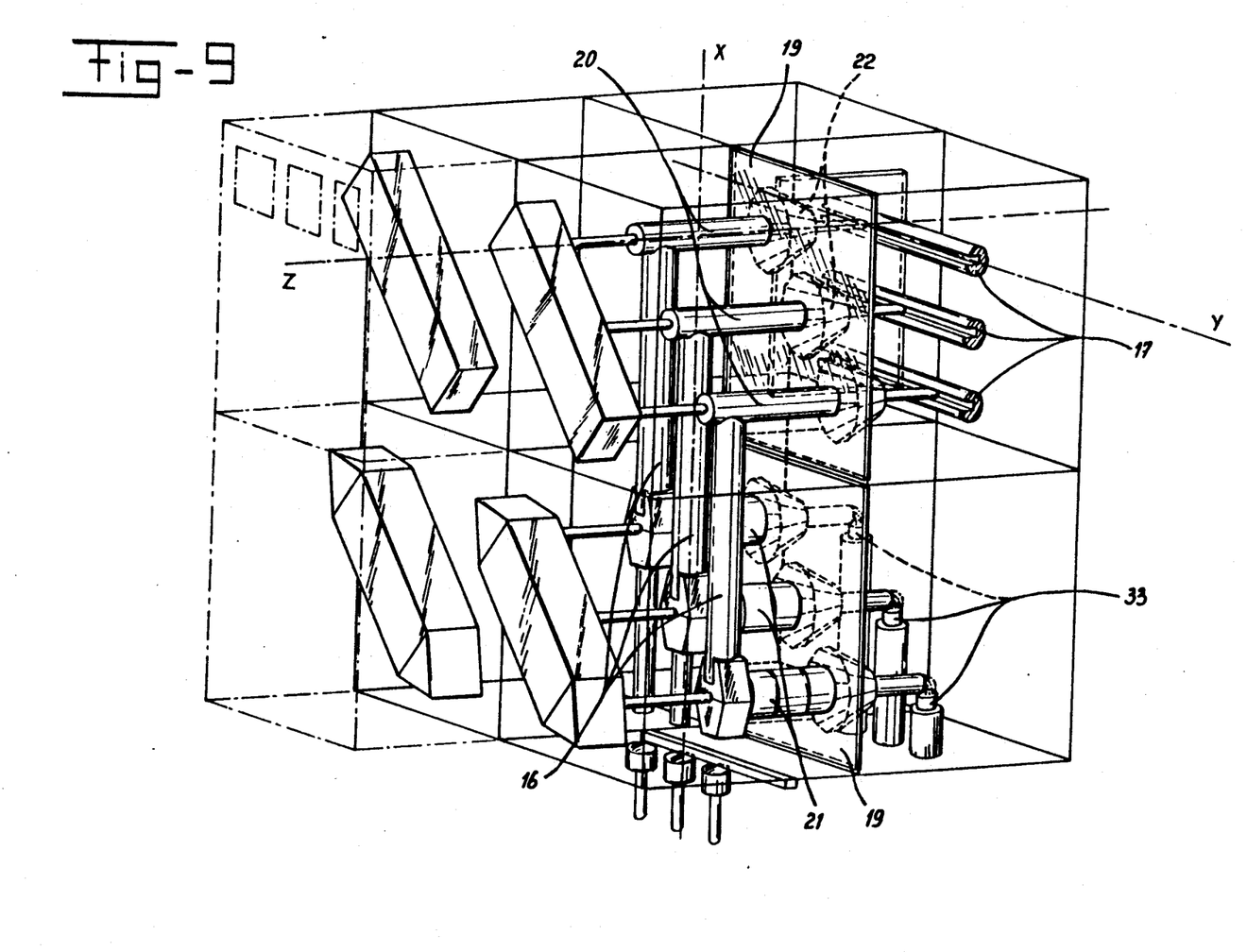
FIG. 9 shows diagrammatically a medium-voltage distribution installation assembled with the aid of compartment modules according to the present invention.

In a medium-voltage distribution system according to, for example, FIG. 9 which is accommodated in the compartment modules according to the invention, insulators 19 which mutually separate the compartment spaces which adjoin each other in a gastight manner but which essentially serve to support the various components in the modules are now placed in these contact surfaces between the flanges 5 and 6 (see FIG. 5). Here, one of the compartment modules at the top rear of FIG. 5 is shown at the top on the left and one of the modules at the front of FIG. 4 on the right. Between the left-hand and the right-hand compartment modules there are now the insulators 19 which are clamped at their rims between the two bent-over strips of the narrow flanges 5 and 6.

On the right in FIG. 5, the vertical busbar system 16 extends through the compartment modules stacked on top of one another and the horizontal busbar system 17 extends in the compartment module at the top on the left. Located between these two busbar systems 16 and 17 are separator switches 20 in the upper compartments which are only shown diagrammatically. Said switches 20 are supported by the specially shaped insulator 19. However, the respective horizontal and vertical busbars are furthermore also supported by the latter. The insulators 19 also serve to mutually seal the compartment spaces in a gastight manner. In the compartment at the bottom on the right, a power switch 21 is shown which is also supported by an insulator 19. To support the switches 20 and 21, the insulators 19 are provided with conical bulges 22. The switches 20 and 21 are assembled or supported in a gastight manner in openings in said bulges.

The compartment module at the top on the left, which is provided at the left-hand side of a large opening 4 having narrow flange 6, can be closed of by assembling a sheet on the narrow outside strip. The same is, of course, possible with the opening at the top in the right-hand compartment module.

Figure 6:
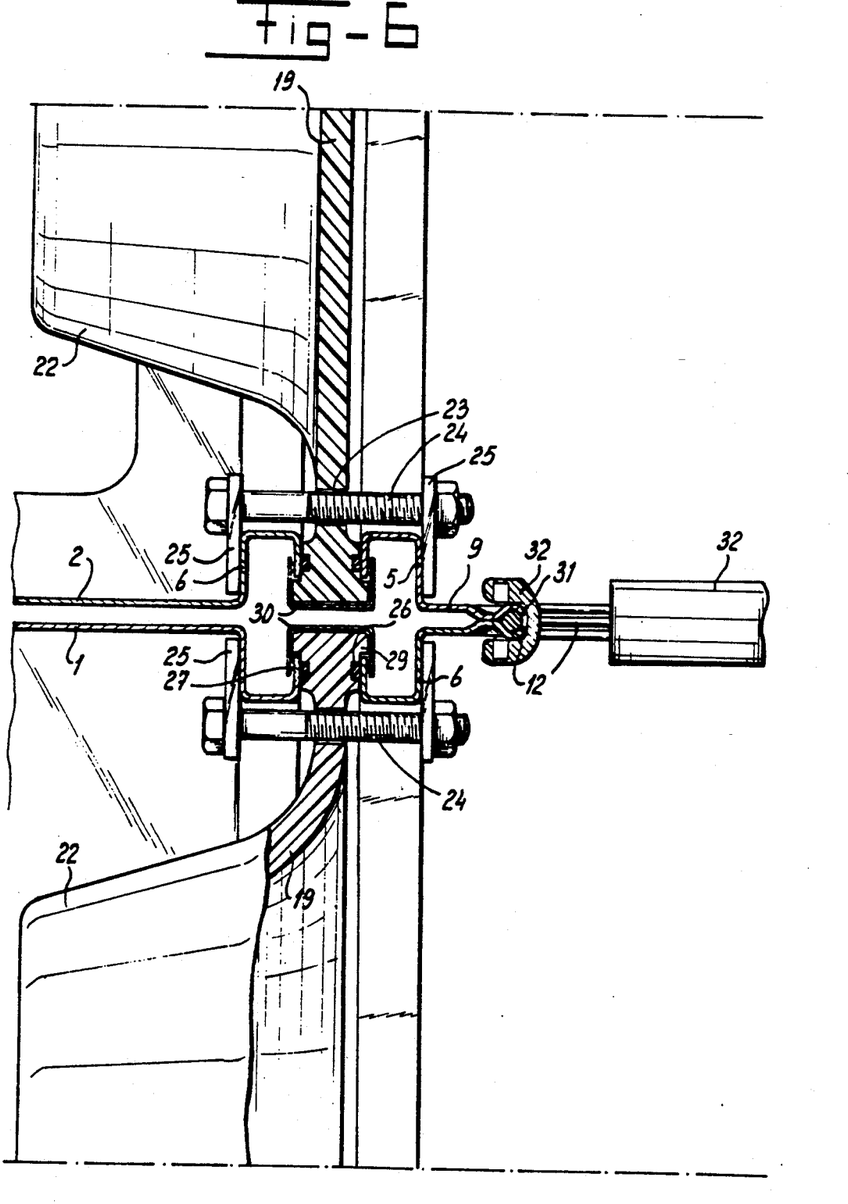
FIG. 6 shows a cross section on a larger scale of a part of FIG. 5 with the fixing and sealing means.

FIG. 6 shows in cross section on a larger scale than in FIG. 5 the method of fixing the insulators 19, as a result of which two compartment modules adjoining each other are also attached to each other. On the right in FIG. 6, the way is shown in which two compartment modules are attached t one another at the position of the small openings 7, 8 having the wide flanges 9, 10.

Figure 7:
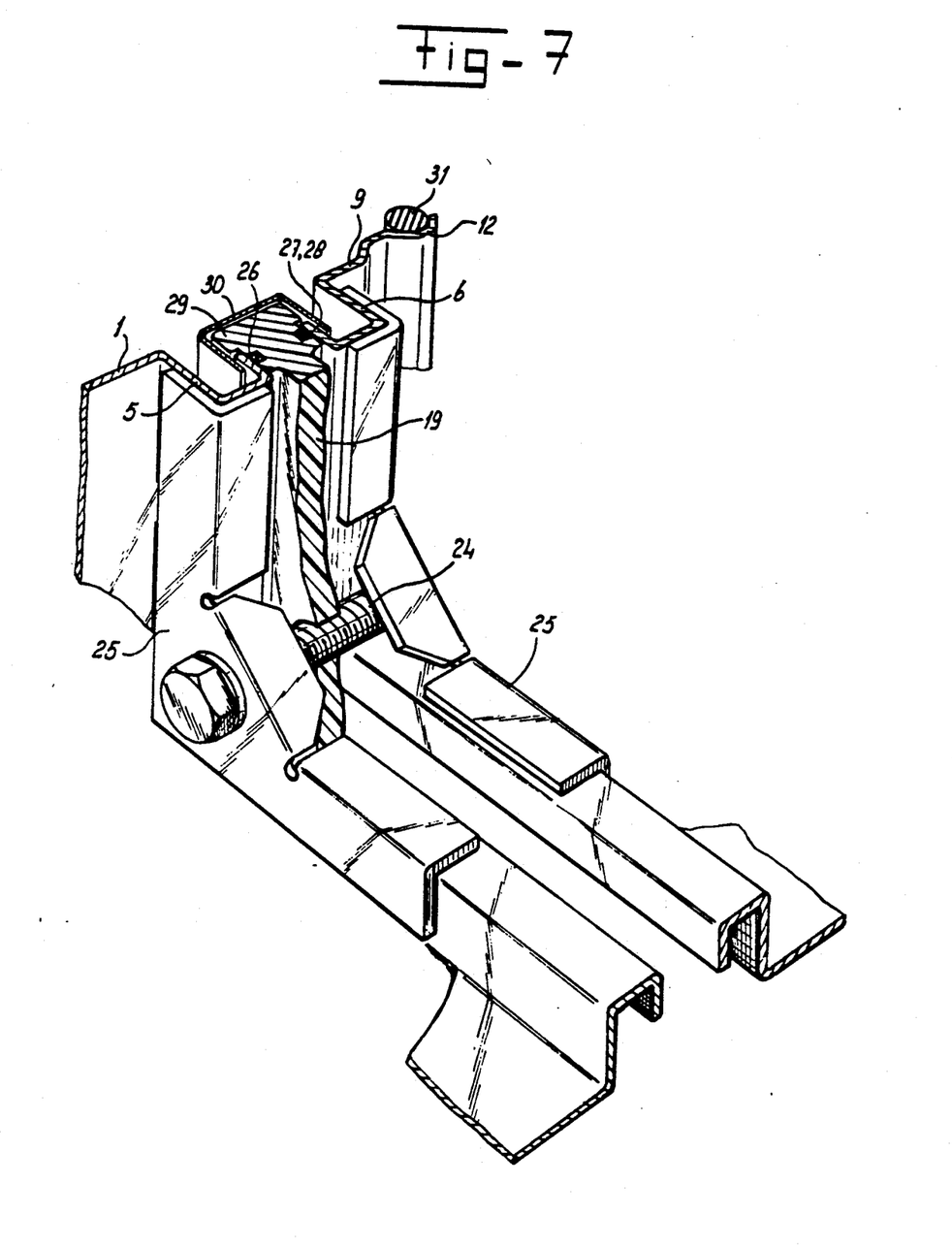
FIG. 7 shows in perspective one of the angular points of a module with strengthening corner piece provided therein.

The insulator 19 is provided with bolt holes 23 near each of its angular points, through which a bolt 24 extends, and with corner pieces 25, which rest against the first, bent-over inside strips of the narrow flanges 5, 6 (see also FIG. 7). The rim of the insulator 19 is widened at 26 and is provided on either side with grooves 27, which contain a sealing element 28. Against these widened parts 26 of the insulator, the narrow bent-over outside strips of the narrow flanges 5, 6 formed when the sheet rim is bent over three times at right angles come to rest. The insulator 19 is furthermore provided at its outside edge with projecting rims 29. A U-shaped clamping element 30 is pushed around said widened parts 26 and the outside rim 29 of the insulator 19 and the flange parts resting against the latter. As a result, the flange parts are pressed on either side against the rims 26, and in addition, against the seal 28. This provides a gastight separation between the compartment modules adjoining one another. The pressing-against can be reinforced still further with the aid of the bolts 24 and the corner pieces 25. The outside rims 29 of the insulator also serve to centre the adjoining flange parts 6 and as a limit to bending outwards as a consequence of an increase in pressure in the event of any internal fault.

Provided in the extremities of the wide flanges 9, 10 near the small openings 7, 8 are grooves 12 which end up mutually opposite when the compartment modules are placed next to each other. A sealing element 31, for example a rubber O-ring, is provided in said grooves 12. From the inside outwards, the flanges 9, 10 with the O-ring 31 situated between them are held clamped against each other by a U-shaped or C-shaped clamping element 32, for example consisting of an extruded aluminum section. This also brings about the electrical connection between modules which adjoin each other. The chosen shape of the grooves 12 and the sealing element 31 centres the adjoining modules with respect to each other, the O-ring also serving as a resilient element for the clamping required.

Figure 8:
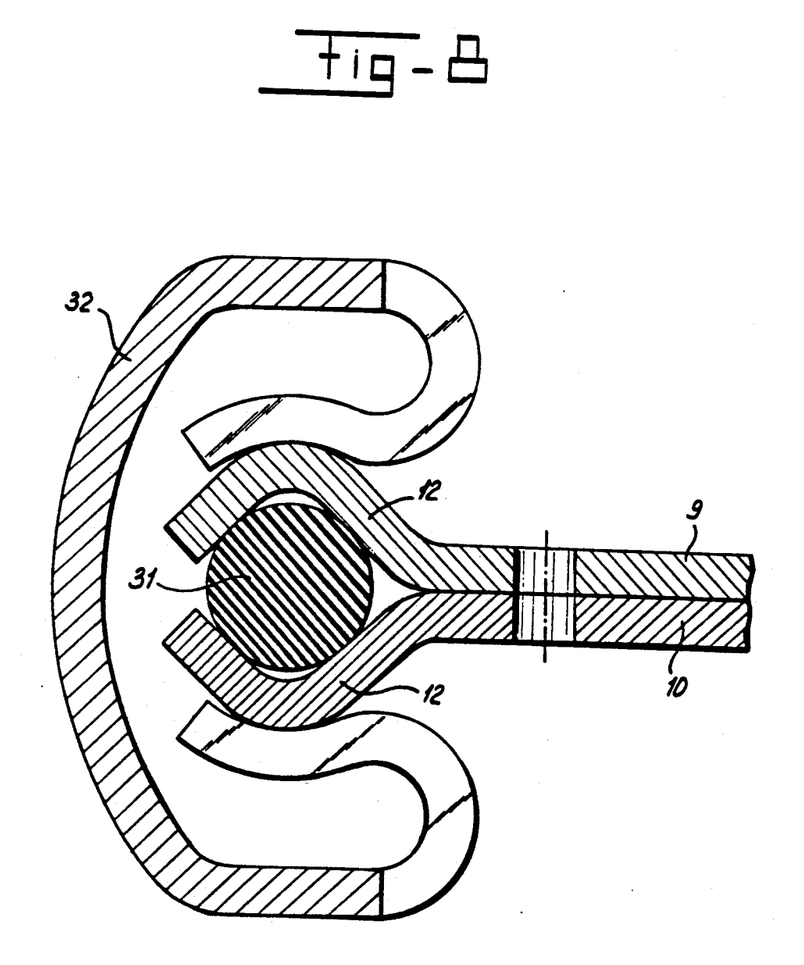
FIG. 8 shows a cross section of another fixing and sealing in the wide flange.

FIG. 8 shows a different embodiment of a clamping element 32, which consists of a resilient section.

FIG. 9 shows a complete medium-voltage distribution installation with components provided therein and assembled from compartment modules according to the present invention, only the circumferential lines of which are shown here.

Located between the compartment modules are the insulators 19. These insulators support isolating switches 20 and power switches 21, respectively. The said latter switches support the vertical busbar system 16. The horizontal busbar system 17 runs on the right of the central insulators 19. The cable connections 33 are located on the right at the bottom in the module. These cable connections can be connected via the power switches 21 to the vertical busbars 16 and the latter in turn to the horizontal busbars via the separators 20.

From the above it is evident that each main function of each switching section in three-phase construction can be accommodated in each compartment module. The module itself comprises a box-type structure and has means of linking in two main directions, namely the walls having the small openings and the large flanges and the walls having the large openings and the small flanges. Each module has mirror symmetry with respect to the three main planes through its centre of gravity. The isolating switches 20 and the power switches 21 are located between modules situated next to one another and are supported by the insulators 19 and consequently support the vertical and horizontal busbar system.

With the modules according to the present invention, any design of a modular medium-voltage system can be created in a simple manner, with all the advantages associated therewith. The modular construction guarantees a flexible construction of the installation, so that variants can be achieved easily and rapidly. Because the modules are all identical, standardisation, and consequently mass production, is possible. The use of the modular construction means that an air gap is produced between the sections, and this offers additional cooling possibilities. The standard linking between the modules guarantees a rapid assembly, few parts and good electromagnetic screening. Finally, the metal-clad installation according to IEC 298 can be achieved in an elegant way with the modular construction.

In particular, the compartment modules according to the invention are suitable for assembling a metal-encased modular medium-voltage distribution system according to Dutch Patent Application 8902799 of the Applicant of the present patent application In the latter, the components extend along the mutually perpendicular axes x, y and z shown in FIGS. 4 and 9. In the compartment modules according to the present invention, said axes run through the centre of gravity of each module.

It is self evident that the invention is not limited to the embodiment, discussed and shown above, of a module, but that alterations and additions are possible without departing from the scope of the invention. For example, the narrow and wide flanges do not need to have the dimensions and the shape shown in the figures.

We claim:

1. A compartment module for a metal-enclosed, modular medium-voltage distribution system, which module is essentially of box-type construction, said module comprising:

a first set of mutually oppositely situated, completely closed walls, a second set of mutually oppositely situated walls which have identical large openings bounded by a narrow flange, and a third set of mutually oppositely situated walls having small openings bounded by a wide flange, wherein said module is composed of two identical halves, each comprising a closed wall part and a wall part having said small openings such that, when said halves are assembled, said large openings are formed and said compartment module is mirror-symmetrical with respect to its center of gravity, said modules being such that when forming a medium-voltage distribution system the modules can be arranged to face one another with similar walls while the remaining openings can be closed off by at least one cover.

2. A compartment module according to claim 1, wherein the narrow flange bounding the large opening comprises a strip, directly adjoining the large opening, which strip is twice bent over outwards at right angles to produce a U-shaped channel whose opening is directed outwards, and projects outside of the module, and in that the wide flange bounding the small opening consists of the remaining part of the wall concerned, the part of the wide flange directly adjoining the small opening being provided over the entire circumference with a groove, the open side of which groove is arranged to face the outside of the module in order to accommodate a sealing ring between said wall and a similar wall of an adjoining module.

3. A compartment module according to claim 2, comprising corner support pieces which are provided in each corner portion of the walls having the narrow flanges and are securely joined to the flange rim.

4. A medium-voltage distribution system composed of a plurality of modules according to claim 2, wherein the walls of modules adjoining each other, in which the smaller openings are provided, are sealed in a gastight manner by a sealing element situated in the grooves which are formed along the smaller openings, and wherein said walls are held against each other at the position of the smaller openings by a U-shaped or C-shaped electrically conducting clamping element which engages on the outside around the groove parts and presses the wide flanges against each other to bring about the electrical connection between modules adjoining each other.

5. A medium-voltage distribution system composed of a plurality of modules according to claim 1, wherein a supporting insulator is accommodated in a gastight manner between the narrow flanges of compartment modules adjoining each other in order to support parts of the medium-voltage distribution system.

6. A medium-voltage distribution system according to claim 5, wherein the insulator contains a rim which is clamped between the narrow flanges of two modules situated next to each other, the insulator being provided on both sides at its circumference with a raised rim facing the narrow flanges of the adjoining modules and has on two sides, in the insulator surface which is in direct contact with the narrow flanges, grooves in which a sealing element can be provided, a U-shaped or C-shaped electrically conducting clamping element being provided around the narrow flanges, adjoining the insulator, of the modules situated next to each other in order to press said flanges against the insulator rim and to bring about an electrical connection between the modules adjoining each other.

7. A method of manufacturing a compartment module for a metal-enclosed, modular medium-voltage distribution system, which module is essentially of box-type construction and composed of two identical halves, said method comprising the steps of:
punching or cutting the module halves from sheet material, each comprising two closed wall parts,
providing a small opening bounded by a wide flange in one of the wall parts,
providing a groove in the wide flange around the small opening,
providing narrow flanges by bending over the module halves at their long sides three times at right angles,
bending over the two wall parts on each other at right angles, and
assembling two module halves, such that a module is formed having a first set of mutually oppositely closed walls, a second set of mutually oppositely situated walls having identical large openings bounded by the narrow flanges, and a third set of mutually oppositely situated walls having the small openings bounded by the wide flanges.

8. A method according to claim 7, wherein one of the wall parts of each module half is provided at its free end with a strip, said strip being bent over at right angles, the module halves being assembled by means of said strips joined to the wall parts of the respective module halves not provided with said strip, such that a box-type module is obtained.

* * * * *